US011731576B2

(12) United States Patent
Fuma et al.

(10) Patent No.: US 11,731,576 B2
(45) Date of Patent: Aug. 22, 2023

(54) SIDE AIRBAG DEVICE

(71) Applicant: Autoliv Development AB, Vargarda (SE)

(72) Inventors: Makoto Fuma, Kanagawa (JP); Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 417 days.

(21) Appl. No.: 16/662,993

(22) Filed: Oct. 24, 2019

(65) Prior Publication Data
US 2020/0130629 A1 Apr. 30, 2020

(30) Foreign Application Priority Data

Oct. 24, 2018 (JP) .................................. 2018-199634
Sep. 17, 2019 (JP) .................................. 2019-168286

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/233* (2013.01); *B60R 21/23138* (2013.01);
(Continued)

(58) Field of Classification Search
CPC ............ B60R 21/207; B60R 21/23138; B60R 21/233; B60R 2021/23146;
(Continued)

(56) References Cited

U.S. PATENT DOCUMENTS 5,499,840 A * 3/1996 Nakano ................ B60N 2/0705
280/730.1
7,549,672 B2 * 6/2009 Sato .................... B60R 21/2338
280/730.2
(Continued)

FOREIGN PATENT DOCUMENTS

JP          201469729 A     4/2014
KR  1020170021964 A  *  3/2017

OTHER PUBLICATIONS

KR-1020170021964-A (machine translation) (Year: 2017).*

*Primary Examiner* — James A English
*Assistant Examiner* — Joselynn Y Sliteris
(74) *Attorney, Agent, or Firm* — Harness, Dickey & Pierce, P.L.C.; Stephen T. Olson

(57) ABSTRACT

Problem: To effectively suppress movement toward a collision site of an occupant even when the occupant is seated only in the driver's seat.
Resolution Means: a side airbag device 1 provided on a side surface portion on the center side in the width direction of the backrest SB of the seat s of one of the driver's seat Sd and the passenger seat Sn, and is provided with a cushion 2 that constrains movement of the occupant p toward a site where an impact is applied during a collision event. A portion of the inflator 3 is inserted into the cushion 2. The cushion 2 comprises a main chamber 2 *a* and a sub-chamber 2 *b* disposed on the base panel 4 *b* opposite the occupant side base panel 4 *a* of the main chamber 2 *a* that is seated by the occupant p seated in the driver seat Sd. Upon collision, when the occupant p seated in the driver's seat Sd moves toward the passenger seat side, the expanded sub-chamber 2 *b* interferes with the side support SS on the driver side of the passenger seat Sn, and the expanded main chamber 2 *a* is provided with the reaction force from the passenger seat Sn.

12 Claims, 7 Drawing Sheets

(51) Int. Cl.
 *B60R 21/233* (2006.01)
 *B60R 21/235* (2006.01)

(52) U.S. Cl.
 CPC ............... *B60R 2021/23146* (2013.01); *B60R 2021/23161* (2013.01); *B60R 2021/23324* (2013.01); *B60R 2021/23576* (2013.01)

(58) Field of Classification Search
 CPC ........... B60R 2021/23161; B60R 2021/23324; B60R 2021/23576; B60R 2021/23308
 See application file for complete search history.

(56) References Cited

U.S. PATENT DOCUMENTS

| | | | |
|---|---|---|---|
| 8,282,126 B2 * | 10/2012 | Wiik | B60R 21/23138 |
| | | | 280/730.2 |
| 8,414,018 B2 * | 4/2013 | Choi | B60R 21/23138 |
| | | | 280/730.1 |
| 8,985,625 B2 | 3/2015 | Gwon et al. | |
| 9,290,151 B2 * | 3/2016 | Fujiwara | B60R 21/231 |
| 9,296,357 B2 * | 3/2016 | Fujiwara | B60R 21/23138 |
| 9,358,943 B2 | 6/2016 | Borjeson et al. | |
| 9,403,500 B2 * | 8/2016 | Ishida | B60R 21/2334 |
| 9,862,345 B2 * | 1/2018 | Ohno | B60R 21/2338 |
| 9,969,351 B2 * | 5/2018 | Ohno | B60R 21/23138 |
| 9,994,181 B1 * | 6/2018 | Dubaisi | B60R 21/207 |
| 10,300,878 B2 * | 5/2019 | Park | B60R 21/2338 |
| 10,336,283 B2 * | 7/2019 | Rickenbach | B60R 21/233 |
| 10,343,638 B2 * | 7/2019 | Fukawatase | B60R 21/23138 |
| 10,407,015 B2 * | 9/2019 | Belwafa | B60R 21/207 |
| 10,486,638 B2 * | 11/2019 | Kwon | B60R 21/23138 |
| 10,543,801 B2 * | 1/2020 | Kwon | B60R 21/2338 |
| 10,640,076 B2 * | 5/2020 | Lee | B60R 21/232 |
| 10,668,887 B2 * | 6/2020 | Fukawatase | B60R 21/233 |
| 10,703,322 B2 * | 7/2020 | Kitagawa | B60R 21/23138 |
| 10,744,970 B2 * | 8/2020 | Ohno | B60R 21/215 |
| 10,974,681 B2 * | 4/2021 | Rathgeb | B60R 21/233 |
| 11,066,036 B2 * | 7/2021 | Gwon | B60R 21/231 |
| 11,077,815 B2 * | 8/2021 | Fukawatase | B60R 21/233 |
| 11,091,114 B2 * | 8/2021 | Komura | B60R 21/23138 |
| 11,214,225 B2 * | 1/2022 | Kobayashi | B60R 21/233 |
| 11,235,724 B2 * | 2/2022 | Kobayashi | B60R 21/23138 |
| 11,242,024 B2 * | 2/2022 | Aki | B60N 2/42 |
| 11,254,276 B2 * | 2/2022 | Kobayashi | B60R 21/23138 |
| 11,491,947 B2 * | 11/2022 | Kanayama | B60R 21/237 |
| 11,608,023 B2 * | 3/2023 | Ikeda | B60R 21/207 |
| 2009/0001695 A1 * | 1/2009 | Suzuki | B60R 21/231 |
| | | | 280/730.2 |
| 2015/0084315 A1 * | 3/2015 | Acker | B60R 21/231 |
| | | | 280/728.2 |
| 2019/0135219 A1 | 5/2019 | Kobayashi et al. | |
| 2019/0283701 A1 | 9/2019 | Zauritz | |
| 2022/0281402 A1 * | 9/2022 | Kanayama | B60R 21/23138 |
| 2022/0281403 A1 * | 9/2022 | Ikeda | B60R 21/23138 |

\* cited by examiner

SIDE AIRBAG DEVICE

CROSS-REFERENCE TO RELATED APPLICATIONS

This application claims the benefit of Japanese Patent Application 2018-199634 filed Oct. 24, 2018, and Japanese Patent Application 2019-168286 filed Sep. 17, 2019, the disclosures of which are herein incorporated by reference in its entirety.

TECHNICAL FIELD

The present invention is, for example, when a vehicle is impinged from a side surface (hereinafter referred to as a side collision event). A side airbag apparatus installed in a vehicle, comprising: In particular, the side surface on the center side in the width direction of the vehicle separated from the side door (for example, the side surface on the passenger side in the case of the driver seat, and the side surface on the driver side in the case of the passenger seat. In the following, it is referred to as a farside.) The present invention relates to a side airbag device that is effective when installed.

Hereinafter, in the present application, "upper" and "upper" refer to the head direction of an occupant seated in the seat in the same manner as "lower" and "lower side". In addition, "front" and "front side" refer to the direction on the front side of the occupant seated in the seat in the "front" or "front side" also refers to the direction on the rear face side. "Lateral direction" refers to the width direction of the vehicle.

BACKGROUND

For example, in a side collision event, a side airbag device that protects an occupant by suppressing movement of an occupant toward a site where an impact is applied, for example, is a backrest of a seat (hereinafter referred to as a "seat back"). Disposed laterally inside.

This side airbag device is a configuration in which, for example, during side collision, the inflator is activated by the output signal emitted by the sensor that detects the impact, and deploys the cushion toward the side of the occupant seated in the seat.

When the side airbag device is installed on a side near the side door, when the occupant collides with the cushion after deployment, movement of the cushion toward the site where the impact is applied is prevented by the reaction force from the side door, and thus movement of the occupant can be suppressed.

However, when the side airbag device is installed on a far side, there is no side door that prevents movement of the cushion toward the site where the impact is applied, as is the case when the side airbag device is installed on the side of the side airbag device. Therefore, in order to suppress movement of the occupant, it is necessary to hold the cushion after deployment and suppress movement toward the site where the shock is applied.

When the side airbag device is installed on the furrow, the suppression of the movement of the cushion after deployment is particularly necessary in a case where the occupant is not seated in the passenger seat compared to when the occupant is seated together with the driver's seat and the passenger seat.

Therefore, various configurations have been proposed in which, in a side airbag device installed on a far side, when an occupant collides with a cushion after deployment, the cushion is prevented from moving toward the site where an impact is applied.

For example, Patent Document 1 discloses a side airbag device provided with a sub-cushion that, when deployed, extends from the upper direction intermediate portion to above the center console box in a main cushion where a lower portion is interposed between the occupant and the center console box when deployed.

In the case of the side airbag device disclosed in Patent Document 1, when deployed, the bottom of the main cushion and the sub-cushion interfere with the center console box, thereby suppressing the main cushion from moving toward the site where the shock is applied.

However, in the case of the side airbag device disclosed in Patent Document 1, the length (height) in the vertical direction of the center console box that interferes with the main cushion and the sub-cushion is limited. Accordingly, when an occupant collides with the main cushion after deployment, it is not possible to sufficiently suppress the movement of the occupant toward the site where the shock is applied.

RELATED ART DOCUMENTS

Patent Documents

Patent Document 1: Japanese Unexamined Patent Application Publication No. 2014-69729

SUMMARY OF THE INVENTION

Problem to be Solved by the Invention

The problem addressed by the present invention is that in the side airbag device in which the main cushion and the sub-cushion of Patent Document 1 interfere with the center console box, the movement of the cushion caused by the movement of the occupant toward the site where the shock is applied cannot be sufficiently suppressed when the vehicle is impinged.

Means for Solving the Problem

In order to solve the problem described above, an object of the present invention is to effectively suppress movement of the cushion caused by movement of an occupant toward a site where an impact is applied when an occupant collides with a cushion after deployment, even when an occupant is seated only in the driver's seat and the passenger seat is available.

That is, the present invention is a side airbag device provided on a side surface portion on the side surface on the far side of the side surface of the seat back of one of the seats and the other seat disposed side by side in the left and right direction, and that constrains the occupant from moving toward the site where an impact is applied during a collision event to protect the occupant.

Within the cushion, an inflator is provided that receives a signal from a sensor to generate a gas and deploys the cushion.

In the present invention, the cushion is provided with a main chamber and a sub-chamber provided on a base panel on an opposite side of the main chamber with respect to the panel of the base fabric on the occupant side of the main chamber that is in contact with the occupant seated in the seat.

In the present invention described above, when, for example, an occupant seated in one seat collides with the other seat side side, the expanded sub-chamber interferes with the side support part on the one seat side formed on the seat back of the other seat when the occupant seated in the seat is moved toward the other seat side. This interference then gives the expanded main chamber a reaction force from the other seat. Therefore, by setting the position of contact of the other seat of the sub-chamber to the side support portion on the seat side in the vertical direction, the main chamber can effectively suppress movement of the main chamber toward the other seat side of the occupant seated in the seat. The outermost contact position on the other seat of the sub-chamber is the position in the vertical direction in which movement of the main chamber in the direction in which the shock is applied can be most effectively suppressed, and the position in the vertical direction in which the shoulder of the occupant, which has moved in the direction in which the shock is applied, comes into contact with the main chamber.

In the present invention, the main chamber is disposed on either the side surface portion on the farside side of the seat back of the seat or on the side surface on the farside side of the seat back of the other seat.

When the main chamber is installed in one seat, the main chamber is attached so that the sub-chamber expands on the front side of the side support part on the one seat side of the seat back of the other seat. Alternatively, the main chamber is attached so that the sub-chamber expands on the side surface on the one seat side of the side support part on the one seat side of the seat back of the other seat.

With such a configuration, movement of the occupant seated in the seat toward the other seat side causes the sub-chamber to abut on the side of the seat of the occupant on the other seat side of the other seat in the former case by movement toward the other seat side of the occupant seated in the seat. On the other hand, in the latter case, the sub-chamber is abutted against the side surface on the one seat side of the side support part on the one seat side of the seat back of the other seat, or on the side surface and the front surface. These abutment can effectively suppress movement of the occupant seated in the seat toward the other seat side effectively.

At this time, if the main chamber is partitioned between the vehicle front side chamber and the vehicle rear side chamber, and the sub-chamber is installed in the vehicle front side chamber, gas flows in the order of the vehicle rear side chamber, the vehicle front side chamber, and the sub-chamber.

On the other hand, if the main chamber is partitioned between the vehicle front side chamber and the vehicle rear side chamber and the sub-chamber is installed in the vehicle rear side chamber, gas flows from the vehicle rear side chamber to the sub-chamber and the vehicle front side chamber and expand smoothly.

Further, if the main portion of the vehicle rear side chamber is deployed in the side support of the driver's seat when the cushion is deployed, the occupant can be more reliably moved away from the collision side. Even when an occupant, such as an out-of-position position, is not seated in the regular position, excessive deployment pressure is not applied to the occupant, which makes it possible to reduce unnecessary damage. The main portion of the vehicle rear chamber is a widespread portion of the vehicle rear side chamber as much as possible, including around the portion where the inflator is disposed.

On the other hand, when the main chamber is installed in the other seat, the sub-chamber is attached to the main chamber so as to deploy one seat side of the seat side support portion on the one side of the seat side. In this way, when deployed, the main chamber can be positioned at substantially the same left and right position as when the main chamber is installed in one seat.

Effects of the Invention

In the present invention, upon impingement, the expanded sub-chamber can interfere with the assistant's seat at the other seat to provide a reaction force from the assistant's seat. Therefore, even when the occupant is seated only in the driver seat, which is one seat, and the passenger seat is available, movement toward the passenger seat side of the occupant seated in the driver's seat can be effectively suppressed.

DESCRIPTION OF THE PREFERRED EMBODIMENT

An object of the present invention is to effectively suppress movement of the cushion caused by movement of the occupant toward the site where the occupant is impacted when the occupant is seated only in the driver's seat and the passenger seat is at the attending seat.

The present invention realized the object by configuring a cushion that constrains movement of an occupant toward a site where an impact was applied at the time of collision, having a configuration in which the main chamber and the sub-chamber are provided, and the expanded sub-chamber interferes with the assistant's seat to provide a reaction force from the passenger seat.

EXAMPLES

Examples of the present invention will hereinafter be described with reference to the figures.

Embodiment 1

Figure 1A:
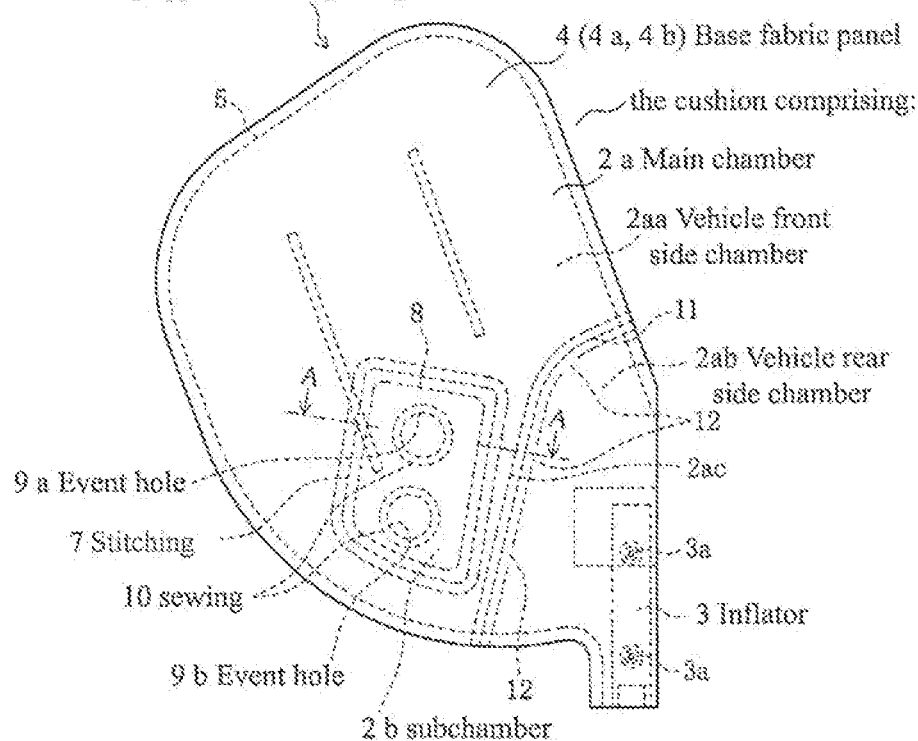
FIG. 1A is a side view illustrating a first embodiment of a side airbag device of the present invention for installation on a seat back of a driver's seat illustrating a state prior to folding of the cushion.
Figure 1B:
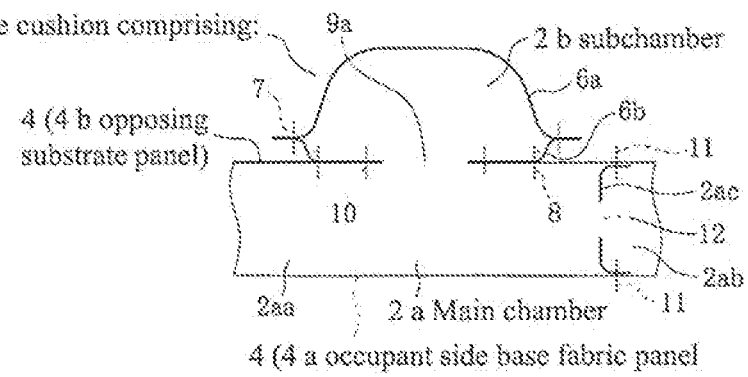
FIG. 1B is an enlarged cross-sectional view along the line A-A in FIG. 1A.
Figure 2A:
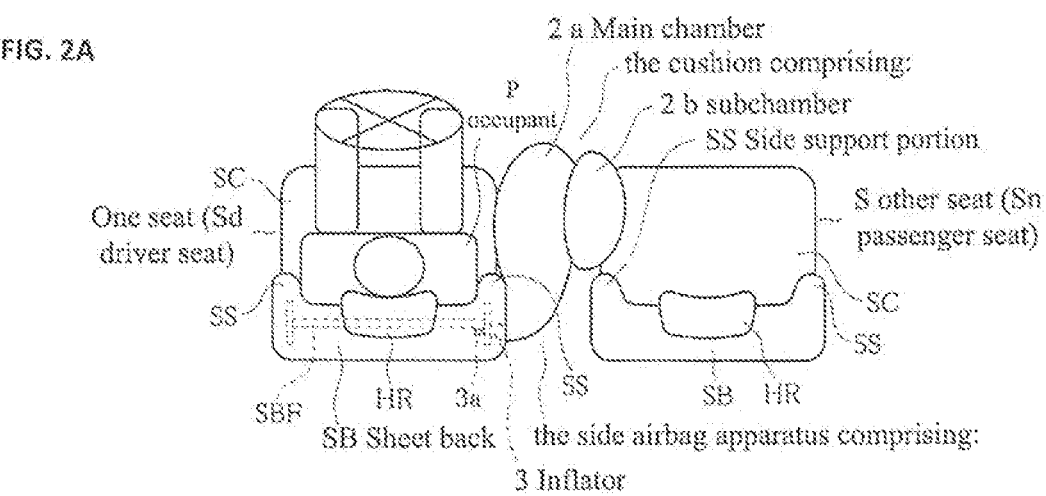
FIG. 2A is a view in which the deployed state of the side airbag device of the present invention illustrated in FIG. 1A is shown incorporated into a vehicle and viewed from above the vehicle.
Figure 2B:
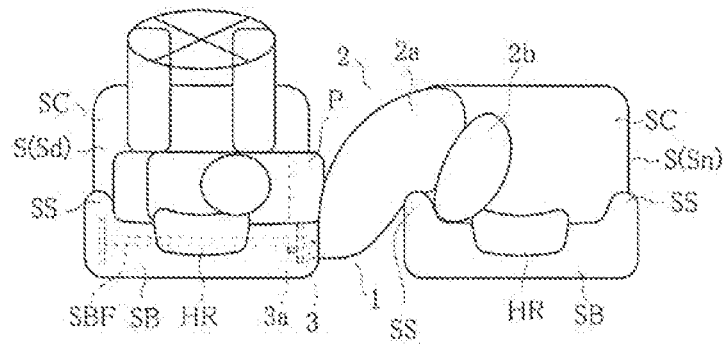
FIG. 2B is a view similar to FIG. 2A illustrating the occupant of the driver's seat moving from the state of FIG. 2A to the passenger seat side, and the state of being held in the cushion after deployment is seen from above the vehicle.

FIGS. 1A and 1B are views illustrating an example of a side airbag device according to an embodiment of the present invention. FIGS. 2A and 2B show the side airbag device of FIGS. 1A and 1B operatively associated with portions of a vehicle.

The side airbag device 1 of the present invention is attached to a seat back frame SBF inside the seat back SB in a sheet frame that functions as a framework of a seat s consisting of a seat cushion SC, a seat back SB, and a headrest HR. Hereinafter, the seat of the driver's seat is designated as Sd, and the other seat, which is the passenger seat, is referred to as Sn.

The side airbag device 1 is configured to receive an output signal from a sensor inside the cushion 2 and eject gas from the outer side of the cushion 2 to the interior of the cushion 2.

Two stud bolts 3 a are provided on the outer surface of the inflator 3 at appropriate intervals in the longitudinal direction thereof, and the cushion 2 is attached to the seat back frame SBF using the stud bolts 3a.

The cushion 2 comprises a main chamber 2a and a sub-chamber 26. Of these, as illustrated in FIGS. 1A and 1B, the main chamber 2a is formed longer in the vertical direction than in the front-back direction, and is formed in a bag shape, for example, by stitching 5 the outer periphery of a single base panel 4 formed with left-right symmetry.

On the other hand, the sub-chamber 2b is formed in a bag shape, for example, by stitching 7 on the outer circumferential side of two of the base panels 6a, 6b, and is attached to the base panel 4b on the side opposite to the panel 4a on the occupant side of the main chamber 2a that is in contact with the occupant p.

Attachment of the sub-chamber 2b to the opposing substrate panel 4b is done, for example, by stitching 8 the outer circumferential side of one of the substrate panels 6b of the sub-chamber 2b to the opposing substrate panel 4b. A vent hole 9a, 9b is provided to flow gas generated in the inflator 3 from the main chamber 2a to the sub-chamber 2b, for example, at two locations on the inner side of the sewing 8. The main chamber 2a (opposing base panel 4b) and the sub-chamber 2b (base panel 6b) are stitched 10 around these vent holes 9a, 9b.

In a first example, the main chamber 2a is partitioned into a vehicle front chamber 2aa and a vehicle rear chamber 2ab by a divider 2ac sewn into the main chamber 2a.

A vent hole 12 is also provided in the partition fabric 2ac so that gas generated by the inflator 3 can flow from the vehicle rear side chamber 2ab into the vehicle front side chamber 2aa.

The vent hole 12 is provided, for example, at a position that is substantially the same as the vertical height position of the vent hole 9a, 9b and a position above the vent hole 9a. By providing a vent hole 12 in that position, gas generated in the inflator 3 is introduced smoothly from the vehicle rear side chamber 2ab to the vehicle front side chamber 2aa and the vehicle front chamber 2aa into the sub-chamber 2b.

Then, upon collisions, the sub-chamber 2b is attached to the vehicle front side chamber 2aa near the vehicle rear side chamber 2ab (see FIG. 1A and FIG. 2A) so as to expand on the front side of the side support part SS on the driver's side formed in the seat back SB of the passenger seat Sn.

On the other hand, by installing the inflator 3 in the vehicle rear side chamber 2ab, the main chamber 2a is attached to the side surface portion of the seat back SB on the driver seat side of the driver seat Sd via the inflator 3.

When colliding, the sub-chamber 2b smoothly expands toward the front side of the side support portion SS of the passenger seat Sn, and as illustrated in FIG. 2b, the sub-chamber 2b abuts the passenger seat side of the side support SS on the driver's seat side of the passenger seat Sn, as illustrated in FIG. 2B.

Due to the interference of the passenger seat Sn of the sub-chamber 2b with the side support unit SS on the driver's seat side, a reaction force from the passenger seat Sn is applied to the expanded main chamber 2a, so it is possible to effectively suppress the occupant p seated in the driver's seat from moving toward the passenger seat side.

If the gas generated by the inflator 3 is smoothly fed into the sub-chamber 2b, it is desirable that the attachment position of the sub-chamber 2-b to the main chamber 2a be near a vertical position in which the shoulder of the occupant p abuts the main chamber 2a after movement.

Embodiment 2

Figure 3A:
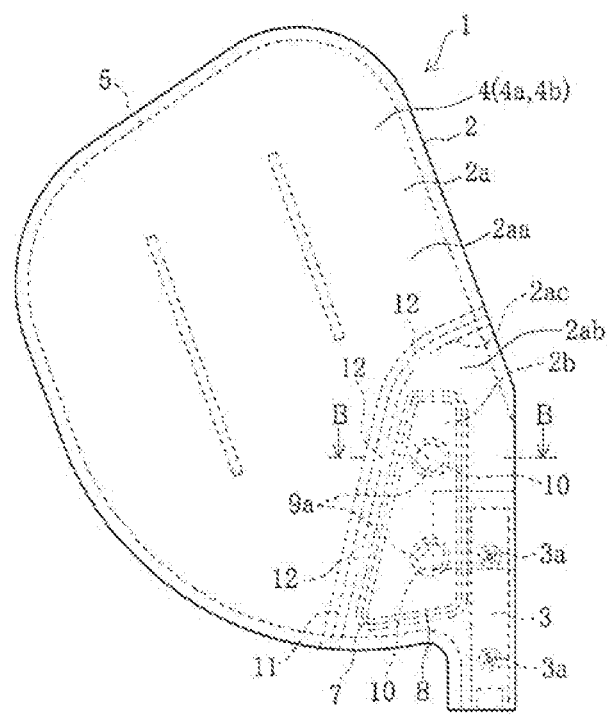
FIG. 3A is a side view illustrating a second embodiment of the side airbag device of the present invention for installation on the front side seat back of the passenger seat illustrating a state prior to folding of the cushion.
Figure 3B:
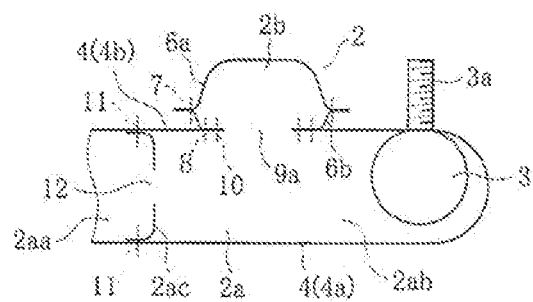
FIG. 3B is an enlarged cross-sectional view taken along the line B-B in FIG. 3A.
Figure 4A:
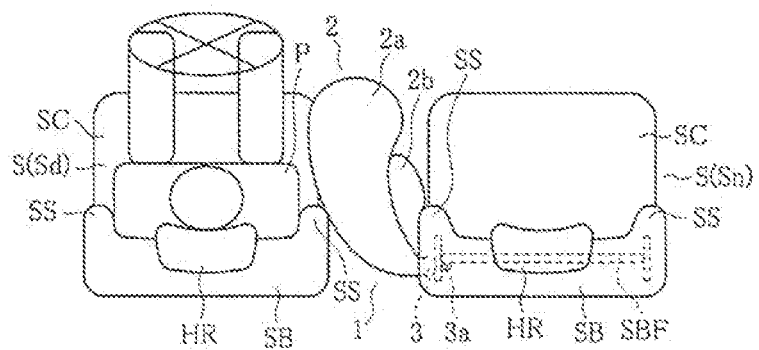
FIGS. 4A and 4B are views of the airbag illustrated in FIG. 3A, similar to FIGS. 2A and 2B, respectively.
Figure 4B:
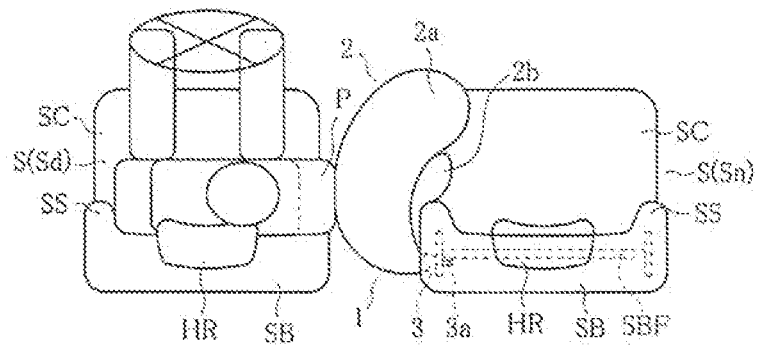

FIGS. 3A and 3B are views illustrating another example of a side airbag device according to an embodiment of the present invention. FIGS. 4A and 4B are similar to FIGS. 2A and 2B and illustrate the side airbag device of the second embodiment within a vehicle. Note that in FIGS. 3A through 4B, the same reference signs as in FIGS. 1A through 2B indicate equivalent or equivalent parts, and detailed description thereof is omitted.

The second example shown in FIGS. 3A through 4B provides a main chamber 2a in the assistant seat Sn. In this second example as well, similar to the first example, the main chamber 2a is partitioned by the divider 2ac into the vehicle front chamber 2aa and the vehicle rear chamber 2ab.

Furthermore, in this second embodiment, the sub-chamber 2b is attached to the vehicle rear side chamber 2ab, and when colliding, as illustrated in FIG. 4A, the sub-chamber 2b expands on the driver's side of the side support part SS on the driver's side of the seat back SB of the passenger seat Sn.

In this way, when deployed, the main chamber 2a can be positioned at substantially the same left and right direction positions as the first example.

In the second example, the vent holes 12 provided in the partition fabric 2 ac are different from the first example in which the sub-chamber 2b is attached to the vehicle front side chamber 2aa, and is provided, for example, at three equal positions in the vertical direction of the partition fabric 2ac. By providing a vent hole 12 in that position, the gas generated in the inflator 3 is smoothly introduced from the vehicle rear side chamber 2ab to the vehicle front side chamber 2aa. Note that the subchamber 2b is directly introduced from the vehicle rear side chamber 2ab.

As illustrated in FIG. 4A, the subchamber 2b expands on the driver side of the side support portion SS of the assistant seat Sn as illustrated in FIG. 4A. When the occupant p moves toward the passenger seat side, as illustrated in FIG.

4B, the sub-chamber 2b abuts the driver side side and the front face of the side support part SS on the driver's side of the seat back SB of the passenger seat Sn and gives the main chamber 2a reaction force from the passenger seat Sn. This reaction force effectively suppresses movement of the occupant p toward the passenger seat side.

Embodiment 3

Figure 5A:
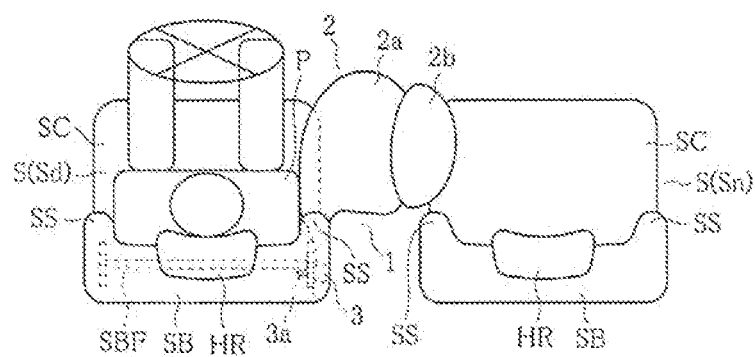
FIGS. 5A and 5B are views similar to FIGS. 2A and 2B, respectively, for describing a third embodiment of the side airbag device of the present invention installed on the seat back of the side of the driver's seat.
Figure 5B:
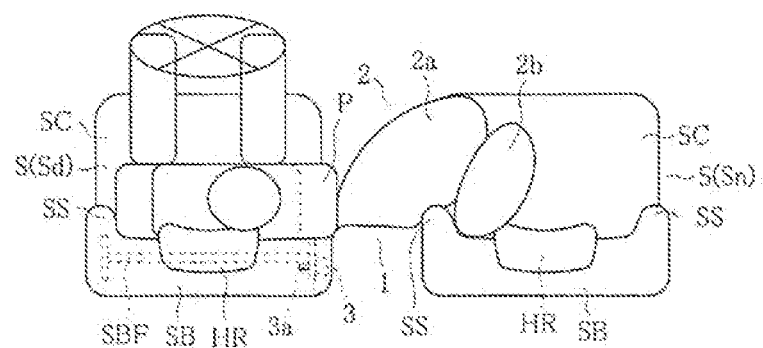

FIGS. 5A and 5B are views similar to FIGS. 2A and 2B, respectively, illustrating another example of a side airbag device according to an embodiment of the present invention. Note that in FIGS. 5A and 5B, the same reference signs introduced above denote equivalent parts or equivalent parts, and detailed descriptions thereof will be omitted.

In the third embodiment illustrated in FIGS. 5A and 5B, during a collision event, the main portion of the vehicle rear side chamber 2ab of the first embodiment is deployed inside the side support part SS on the passenger side of the seat back SB of the driver seat Sd.

Specifically, the mounting position of the inflator 3 in the vehicle rear side chamber 2ab is moved forward from the end as in the first embodiment, and when deployed, the majority of the vehicle rear side chamber 2ab is accommodated within the side support portion SS. In the example illustrated in FIGS. 5A and 5B, when deployed, the cushion 2 expands from the front surface side of the side support portion SS.

In this way, the occupant p can be more reliably moved away from the passenger seat Sn, which is the collision side. Accordingly, the occupant p seated in the driver's seat does not apply excessive deployment pressure to the occupant p even when the occupant p seated in the driver's seat is in an out-of-position position or the like. Note that the out-of-position position refers to a state in which the occupant p is not seated in the regular position, and for example, a state where the occupant is seated in a state of large front bending, and the like.

Needless to say, while the present invention is not limited to the abovementioned examples, the embodiments may be appropriately changed within the scope of the technical ideas described in each claim.

That is, the side airbag device described above is a preferred example of the present invention, and other embodiments are also included. Unless particularly limited in the specification of the present application, the shape, size, and configuration, arrangement, etc. of the detailed parts illustrated in the appended drawings in the present invention are not restricted. Moreover, the expressions and terms used in the specification of the present application are for the purpose of description and not limited thereto unless specifically limited.

For example, as illustrated in FIGS. 6A, 6B and FIGS. 7A, 7B, the sub-chamber 2b may be deployed on the driver side of the side support part SS on the driver side of the seat back SB of the passenger seat Sn, similar to the second embodiment, as illustrated in FIGS. 6A, 6B and 7A, 7B.

For the fourth and fifth embodiments shown in FIGS. 6A, 6B and 7A, 7B, respectively, the sub-chamber 2b attaches to the vehicle rear side chamber 2ab.

Figure 6A:
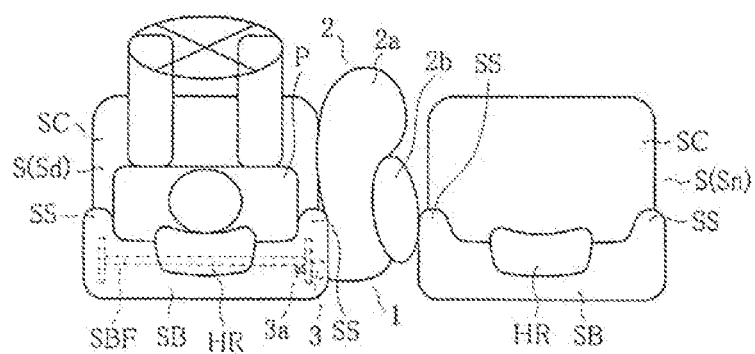
FIGS. 6A and 6B are views similar to FIGS. 2A and 2B, respectively, for describing a fourth embodiment of the side airbag device of the present invention installed on the seat back of the vehicle seat.
Figure 6B:
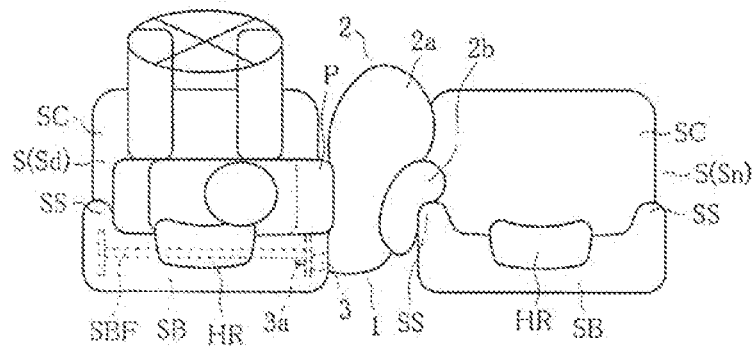

Furthermore, in the fourth embodiment in FIGS. 6A and 6B, when the occupant p moves toward the passenger seat side during a collision, the deployed sub-chamber 2b abuts the driver side side and the front face of the side support part SS of the seat back SB of the passenger seat Sn as illustrated in FIGS. 6A and 6B.

Figure 7A:
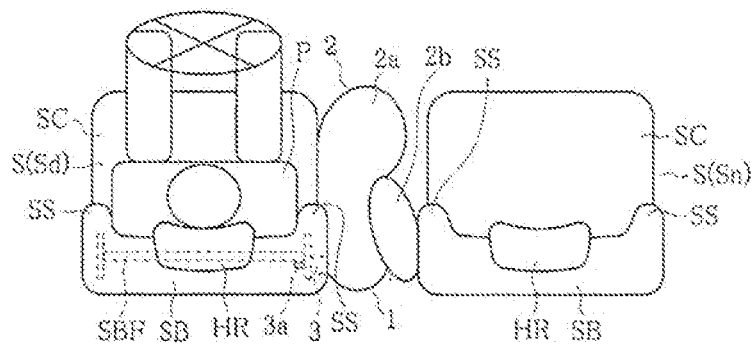
FIGS. 7A and 7B are views similar to FIGS. 2A and 2B, respectively, for describing a fifth embodiment of the side airbag device of the present invention installed on the seat back of the vehicle seat.
Figure 7B:
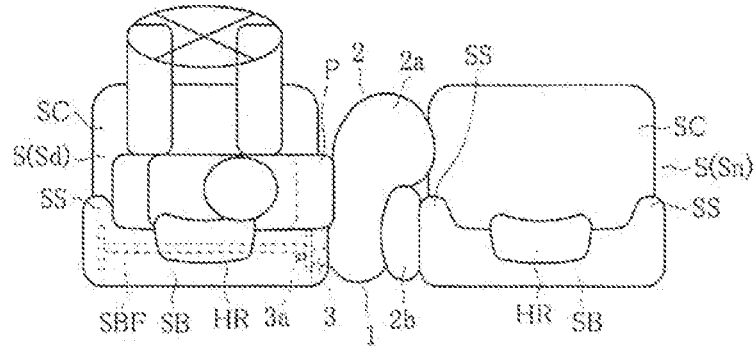

On the other hand, in the fifth embodiment in FIGS. 7A and 7B, when the occupant p moves toward the passenger seat side during a collision, the deployed sub-chamber 2b abuts the driver side side of the side support portion SS of the seat back SB of the passenger seat Sn as illustrated in FIGS. 7A and 7B.

Accordingly, in the fourth and fifth embodiments illustrated in FIGS. 6A, 6B and 7A, 7B, a reaction force from the passenger seat Sn can be applied to the expanded main chamber 2a, and the movement of the occupant p toward the passenger seat side can be effectively suppressed.

Note that in the fourth example shown in FIG. 6, the sub-chamber 2b attaches to the vehicle rear chamber 2ab but may attach the sub-chamber 2b near the divider 2ac of the vehicle front chamber 2aa.

Also, the main chamber 2a of the cushion 2 is defined in the vehicle front side chamber 2aa and the vehicle rear side chamber 2ab in the fifth embodiment shown in FIGS. 7A, 7B, but not necessarily into the vehicle front side chamber 2aa and the vehicle rear side chamber 2ab.

REFERENCE NUMERALS the side airbag apparatus comprising:
the cushion comprising:
2a Main chamber
2aa Vehicle front side chamber
2ab Vehicle rear side chamber
2b subchamber
3 Inflator
4 Base fabric panel
4a Body panel on occupant side
4b Reverse base panel
9a, 9b Event hole
10 sewing
S seat
Sd One seat (driver seat)
Sn Second seat (passenger seat)
SB Seat back
SS Side support portion
SBF Seat back frame
P occupant

The invention claimed is:

1. A side airbag device in combination with a vehicle seating arrangement including first and second seats laterally spaced apart from one another, the side airbag device comprising:
   an airbag cushion carried by and deployable from a first seatback of the first seat; and
   an inflator within the airbag cushion that receives a signal from a sensor to generate a gas and deploys the cushion; and
   wherein the cushion includes a main chamber and a sub-chamber, the main chamber partitioned into a vehicle front chamber and a vehicle rear chamber by a divider, the sub-chamber mounted on a lateral side of the vehicle front chamber facing away from the first seat, and
   wherein the sub-chamber is deployable forward of a side support portion of the second seat and the airbag cushion is configured such that the main chamber abuts a first lateral side of the side support portion and the sub-chamber abuts a second lateral side of the side support portion during a collision.

2. The side airbag device according to claim 1, wherein the main chamber is provided on a side surface portion of the first seatback of the first seat.

3. The side airbag device according to claim 1, further comprising a vent hole through which gas generated by the inflator flows is provided in an attachment portion between the sub-chamber and the main chamber, and wherein a periphery of the vent hole and an outer peripheral portion of the sub-chamber are coupled by stitching.

4. The side airbag device according to claim 1, wherein the sub-chamber is configured to be attached near a position in which a shoulder of an occupant abuts a main chamber.

5. The side airbag device according to claim 1, wherein the second seat provides a reaction force applied to the main chamber.

6. A side airbag device in combination with a vehicle seating arrangement including first and second seats laterally spaced from one another, the side airbag device comprising:
   an airbag cushion carried by and deployable from the second seat; and
   an inflator within the airbag cushion that receives a signal from a sensor to generate a gas and deploys the cushion;
   wherein the cushion includes a main chamber and a sub-chamber, the main chamber partitioned into a vehicle front chamber and a vehicle rear chamber by a divider, the sub-chamber mounted on a lateral side of one of the vehicle front chamber and the vehicle rear chamber facing away from the first seat, and a vent hole through which gas generated by the inflator flows is provided in an attachment portion between the sub-chamber and the main chamber, and
   wherein upon deployment the main chamber includes a first side facing the first seat and a second side opposite the first side and the sub-chamber is disposed between the second side of the main chamber and a forwardly extending side support portion of the second seat, a portion of the sub-chamber extending forwardly beyond the side support portion.

7. The side airbag device according to claim 6, wherein the sub-chamber is configured to be attached near a position in which a shoulder of an occupant abuts the main chamber.

8. The side airbag device according to claim 6, wherein the sub-chamber is mounted on the lateral side of vehicle rear chamber.

9. A side airbag device in combination with a seating arrangement including a first seat and a second seat, the side airbag device comprising:
   an airbag cushion; and
   an inflator within the cushion that receives a signal from a sensor to generate a gas and deploys the cushion;
   wherein the airbag cushion includes a main chamber and a sub-chamber, the main chamber partitioned into a vehicle front chamber and a vehicle rear chamber by a divider, the sub-chamber mounted on a lateral side of one of the vehicle front chamber and the vehicle rear chamber, and
   wherein the main chamber is mounted to the first seat for deployment from a lateral side of the first seat,
   wherein upon deployment the main chamber includes a first side facing the second seat and a second side opposite the first side and the sub-chamber is disposed between the first side of the main chamber and the second seat, the sub-chamber configured and arranged to engage a seatback of the second seat, and
   Wherein the airbag cushion further comprises a vent hole through which gas generated by the inflator flows is provided in an attachment portion between the sub-chamber and the main chamber.

10. The side airbag device according to claim 9, wherein the sub-chamber is mounted on the lateral side of one of the vehicle front chamber and the vehicle rear chamber facing away from the first seat.

11. The side airbag device according to claim 10, wherein the sub-chamber is mounted on the lateral side of vehicle rear chamber.

12. The side airbag device according to claim 9, wherein the sub-chamber is mounted on the lateral side of vehicle rear chamber.

* * * * *